(12) United States Patent
Mandt

(10) Patent No.: US 6,621,532 B1
(45) Date of Patent: Sep. 16, 2003

(54) EASY METHOD OF DRAGGING PULL-DOWN MENU ITEMS ONTO A TOOLBAR

(75) Inventor: Brenda Lynn Mandt, Rose Creek, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/004,552

(22) Filed: Jan. 9, 1998

(51) Int. Cl.[7] .................................................. G09G 5/00
(52) U.S. Cl. ........................ 348/841; 345/808; 345/810; 345/781; 345/843
(58) Field of Search ................................. 345/333, 452, 345/338, 347, 711, 778, 779, 781, 808, 810, 818, 819, 820, 825, 828, 841, 843, 856

(56) References Cited

U.S. PATENT DOCUMENTS

| | | | |
|---|---|---|---|
| 5,241,655 A | * 8/1993 | Mineki | 345/354 |
| 5,367,626 A | * 11/1994 | Morioka | 345/348 |
| 5,448,695 A | * 9/1995 | Douglas | 345/338 |
| 5,644,739 A | * 7/1997 | Moursund | 345/333 |
| 5,668,965 A | * 9/1997 | Matsumoto | 345/333 |
| 5,673,405 A | * 9/1997 | Tange | 345/333 |
| 5,812,805 A | * 9/1998 | Kitayama | 345/333 |

\* cited by examiner

Primary Examiner—Kristine Kincaid
Assistant Examiner—Thomas J Joseph
(74) Attorney, Agent, or Firm—Bracewell & Patterson, LLP

(57) ABSTRACT

A method for utilization within a graphical user interface having at least one pull-down menu and at least one tool bar. The method commences with a user selecting a menu heading which displays a pull-down menu in response to a first user input, such as a left pointing device button or a left mouse button. Next, a user selects a menu item within the displayed pull-down menu again utilizing the pointing device. Then the user designates a menu item for conversion by utilizing a second user input or a right mouse button. Next, the designated menu item is drug from the pull-down menu and dropped onto the toolbar in response to the pointing device and a second user input. Then the method automatically converts the dropped menu item into a selectable toolbar button within the toolbar. A user who frequently utilizes a menu item within a pull-down menu can convert frequently utilized menu items into toolbar buttons by designating and dragging the menu items and then dropping the menu item onto the toolbar utilizing a right mouse button.

4 Claims, 6 Drawing Sheets

EASY METHOD OF DRAGGING PULL-DOWN MENU ITEMS ONTO A TOOLBAR

BACKGROUND OF THE INVENTION

1. Technical Field

The present invention relates in general to an improved graphical user interface and in particular the present invention relates to an improved system and method for creating a selectable toolbar button from a pull-down menu selection with maximum efficiency and minimum complexity. Still more particularly, the present invention relates to an improved graphical user interface which creates a selectable toolbar button in response to a user selecting and dragging a menu item and dropping the menu item onto a toolbar.

2. Description of the Related Art

Conventional computer systems often employ a graphical user interface (GUI) to present information to the user and to accept user commands. A graphical user interface is a type of display format which enables a user to command the computer system. Additionally, a graphical user interface allows a user to start processes, view file content and to select tools. Additionally, GUI allows a user to command many selectable tools by pointing to a desired selection and depressing a push button. A desired selection might be a textual reference or a list of menu items on a computer display screen. A user selectable choice can generally be activated by either a keyboard or a push-button switch located on a pointing device such as a mouse. A mouse is a commonly utilized pointing device, generally containing more than one button. A pointing device allows a user to interact with a product or operating environment, such a graphical user interface.

Some conventional graphical user interfaces provide a cursor and scroll bar for scrolling through portions of a viewable object. A viewable object can contain multiple components such as spreadsheets, text, hotlinks, pictures, sound, and video objects. However, a viewable object is not limited to these components. In many types of graphical user interfaces, a vertical or horizontal bar at the side, bottom or top of a graphical user interface window can be utilized in conjunction with a pointing device such as a mouse, trackball, or stylus to move a pointer about in a graphical user interface. Additional vertical and horizontal bars may contain "selectable buttons." Selectable buttons are commonly called "icons" by those familiar with graphical user interfaces. An icon is a selectable button viewable within a graphical user interface, typically containing a pictorial representation or a mnemonic of a selectable feature.

Generally, the pictorial representation contained within an icon is a graphic symbol allowing a user to associate an icon with a particular selectable function. An icon can be selected by pointing to the icon utilizing a pointing device and activating a push-button on the mouse when the icon is pointed to. Pointing to a selectable icon and depressing a mouse button is referred to as "pointing and clicking" on the icon. "Pointing and clicking" is a user friendly way to select a particular function or software application. Generally, an icon contains a visual mnemonic which allows a user to identify a selection without having to remember commands or type in commands utilizing a keyboard.

Horizontal or vertical bars containing textual menu category headings are commonly referred to as menu bars. Horizontal or vertical bars containing icons are commonly referred to as toolbars. Toolbars are a well known part of graphical user interfaces which simplify access to files and programs utilizing "point and click" user commands. Toolbar selectable user commands provide efficient interface between the user and a computer system. Often, user selectable commands located on a toolbar are duplicated in the menu bar. It is easier and more efficient to activate selections within a toolbar than to locate and select menu headings and corresponding menu items. Menu items are not continuously displayed and a menu heading must be selected to view a list of menu items. However, icons on a toolbar are always visible and immediately accessible by a user.

Some graphical user interfaces employ so-called "bubble help". The "bubble help" feature within a graphical user interface allows a user to select a mode wherein, when a graphical pointer is placed over a toolbar button, a small conversation bubble appears on the screen containing information about the function performed by the selectable button. Bubble help can increase the visual complexity of the graphical user interface.

Each computer operator utilizes a computer for different tasks. Different users have different computational requirements and each user utilizes different avenues to reach the same results. Consequently, each computer operator utilizes different menu and toolbar items according to his or her requirements. For example, one operator may utilize a specific toolbar icon many times per day, while another operator may almost never utilize this identical selection. It would be desirable to allow a user to efficiently create a custom toolbar derived from menu item selections. Utilization of toolbar buttons to access software tools provides a user friendly and efficient operator interface.

A computer user may desire a specific toolbar selection or icon to be readily available for a short time while a specific project is undertaken. After completion of that project, a different toolbar would increase a user's efficiency, and therefore, be highly desirable to the user. Some application programs such as Windows 95 or Lotus Notes allow the user to add icons to a toolbar. However, all such application programs which allow adding of icons to a toolbar, accomplish toolbar customization with a series of menu selections and mode based decisions which are contained under menu headings. Windows 95, Lotus and other programs require opening multiple files and performing multiple steps, such as selecting through a series of menu and sub-menu items. Windows 95 is a registered trademark of Microsoft Corporation.

In all known graphical user interfaces, it is not intuitive to the user what menu items or functions must be selected by the user in order to create a new toolbar icon or to modify an existing toolbar. Currently, custom toolbar methods are convoluted and cumbersome such that many novice computer users will not attempt toolbar alteration. If toolbar alternation is attempted and the existing toolbar is degraded, it could require considerable time and effort to recover or return the toolbar to an original configuration. Additionally, if a user erroneously creates a toolbar which is less efficient or inoperable, valuable time may be wasted.

With known graphical user interfaces, each time a sub-menu item is selected, which is listed under a menu heading, user precision is required to highlight the menu heading, traverse the newly displayed sub-menu items, then move laterally to a sub-menu or auxiliary menu and then traverse the sub-menu while keeping the mouse button depressed and then releasing the mouse button on the desired sub-menu selection. A computer operator is required to perform abrupt changes in the motion of the mouse to select a concealed menu item. During menu item selection, a user cannot be clumsy or inattentive, because a menu item selection might be made which was not desired. A sub-menu item is typically less than quarter of an inch in height on a typical display or monitor. Therefore, substantial dexterity is required to traverse menus and select desired menu items utilizing a pointing device, further coordinated with mouse button activation. In contrast, items selectable from a toolbar do not require activation of menus, traversing of menus and/or traversing of sub-menus. Erroneous menu selections often result when a user over-shoots his intended menu item selection by only a fraction of an inch.

It would, therefore, be desirable to devise a method of minimal complexity which allows users to efficiently create a custom toolbar. It would be further advantageous if the method would retain current toolbar and pull-down behavior, but extend user functionality without increasing the conversion complexity.

SUMMARY OF THE INVENTION

It is therefore one object of the present invention to provide an enhanced graphical user interface.

It is another object of the present invention to provide an improved system and method for creating a selectable toolbar button from a pull-down menu selection with maximum efficiency and minimum complexity.

It is yet another object of the present invention to provide an improved graphical user interface which creates a selectable toolbar button in response to a pointing device input of selecting and dragging a menu item then dropping the menu item onto a toolbar.

The foregoing objects are achieved as is now described. A method is disclosed for utilization within a graphical user interface having at least one pull-down menu and at least one tool bar. The method initiates by a user selecting a menu heading which displays a pull-down menu in response to a first user input, such as a left pointing device button or a left mouse button. Next, a user selects a menu item within the displayed pull-down menu again utilizing the pointing device. Then the user designates a menu item for conversion by utilizing a second user input or a right mouse button. Next, the designated menu item is dragged from the pull-down menu and dropped onto the toolbar in response to the pointing device and a second user input. The method then automatically converts the dropped menu item into a selectable toolbar button within the toolbar. A user who frequently utilizes a menu item within a pull-down menu can convert frequently utilized menu items into toolbar buttons by designating and dragging the menu items and then dropping the menu item onto the toolbar utilizing a right mouse button.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention is directed to a computer system having a graphical user interface (GUI). The present invention provides easy creation of a toolbar selection which can be derived from a pull-down menu item.

Figure 1:
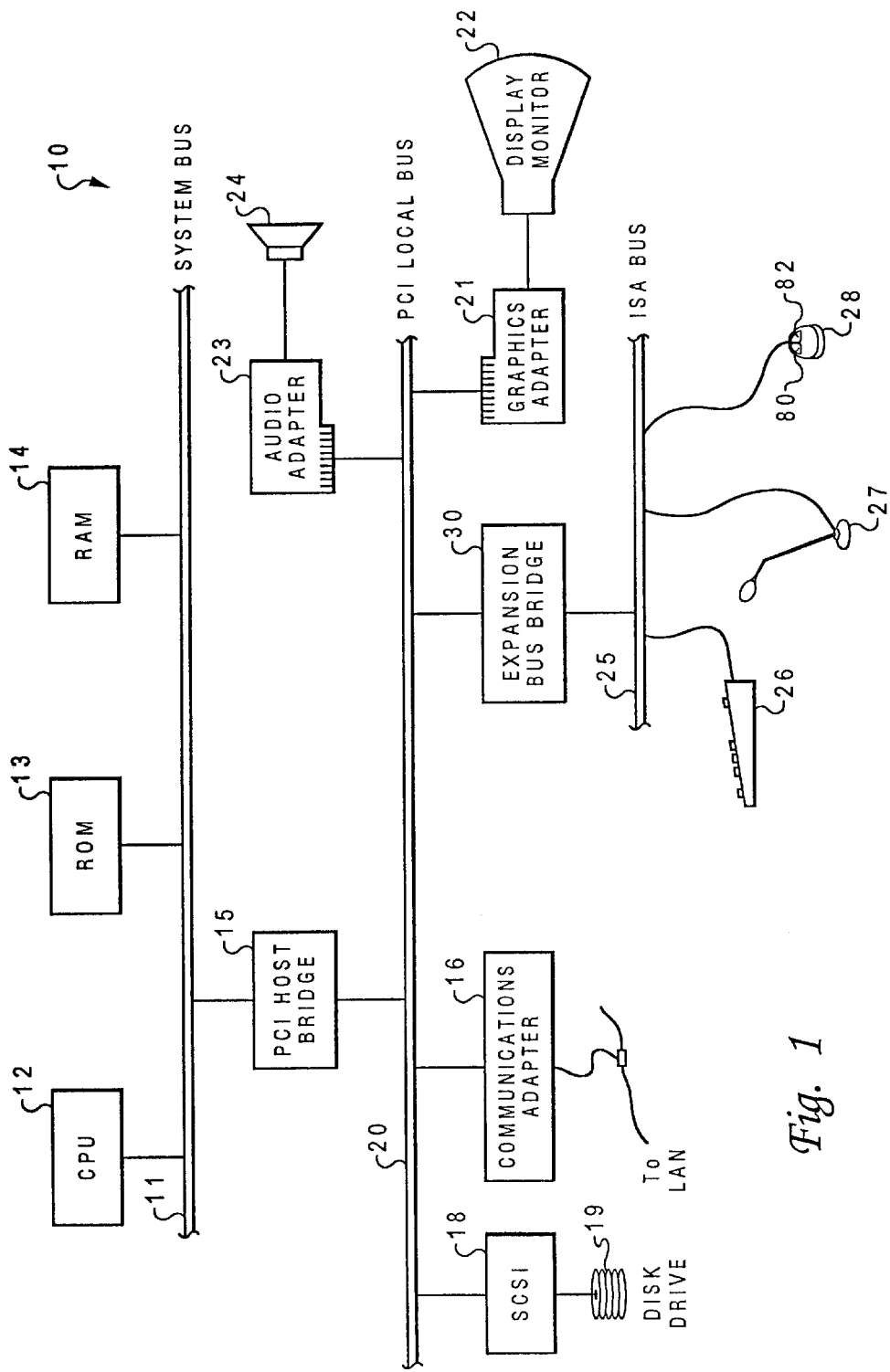
FIG. 1 illustrates a block diagram of a conventional computer system in accordance with the present invention.

With reference now to the figures and in particular with reference to FIG. 1, there is depicted a diagram of a typical computer system 10 which may be utilized in conjunction with a preferred embodiment of the present invention. As depicted, a central processing unit (CPU) 12, a read-only memory (ROM) 13, and a random access memory (RAM) 14 are connected to a system bus 11 of a computer system 10. CPU 12, ROM 13, and RAM 14 are also coupled to a PCI local bus 20 of computer system 10 through a PCI host bridge 15. PCI host bridge 15 provides a low latency path through which CPU 12 may directly access PCI devices mapped anywhere within bus memory and/or input/output I/O address spaces. PCI host bridge 15 also provides a high bandwidth path allowing PCI devices to directly access RAM 14.

In addition, an audio adapter 23 may be attached to PCI local bus 20 for controlling audio output to speaker 24. A graphics adapter 21 may be attached to PCI local bus 20 for controlling visual output to display monitor 22. Also attached to PCI local bus 20 is a small computer system interface (SCSI) 18, and a communications adapter 16. SCSI 18 is utilized to control high-speed disk drive 19. Communications adapter 16 allows computer system 10 to be connected to a local-area network or to other computer systems (not illustrated).

A PCI-to-ISA bus bridge, such as an expansion bus bridge 30 may be utilized for coupling an ISA bus 25 to PCI local bus 20. As depicted, a keyboard 26, a microphone 27, and a pointing device 28 such as a mouse may be attached to ISA bus 25 for performing certain basic I/0 functions. Typically, a mouse has two push-buttons, left pointing device button 80 and right pointing device button 82. Generally, the left pointing device button 80 is utilized for selecting operations within the GUI.

Although the illustrated exemplary embodiment describes a PCI local bus 20 and an ISA bus 25, the present invention is not limited to the described bus architectures. Rather, the present invention can be implemented by any bus configuration which is functional. FIG. 1 depicts an architecture commonly utilized to in a modern personal computer. Additionally, a subset of the depicted computer elements or a state-of-the art sophisticated computer system could effectively accomplish the features of the present invention. FIG. 1 should not be construed in a limiting sense, as it is only one representative model of a system which will operate effectively in conjunction with the present invention.

Those skilled in the art will further appreciate that there are other components that might be utilized in conjunction with those shown in the block diagram of FIG. 1; for example, a compact disk read only memory (not shown) connected to PCI local bus 20 might be utilized to provide software to computer system 10 via a memory controller (also not shown). Computer system 10 may also include software such as firmware whose primary purpose is to seek out and load an operating system from one of the peripheral devices. Again, the computer system utilized in the present invention should not be considered limiting the present invention in any manner.

It is important to note that, while the present invention has been (and will continue to be) described in the context of a fully functional computer system, those skilled in the art will appreciate that the present invention is capable of being distributed as a program product in a variety of forms, and that the present invention can be applied equally, regardless of the particular type of signal-bearing media utilized to actually carry out the distribution. Examples of signal-bearing media includes: recordable-type media, such as floppy disks, hard disk drives, and CD ROMs, and transmission-type media such as digital and analog communication links. Examples of transmission media include devices such as modems. Modems are communication devices that enable computers such as computer system 10 to transmit information over standard telephone lines.

Figure 2:
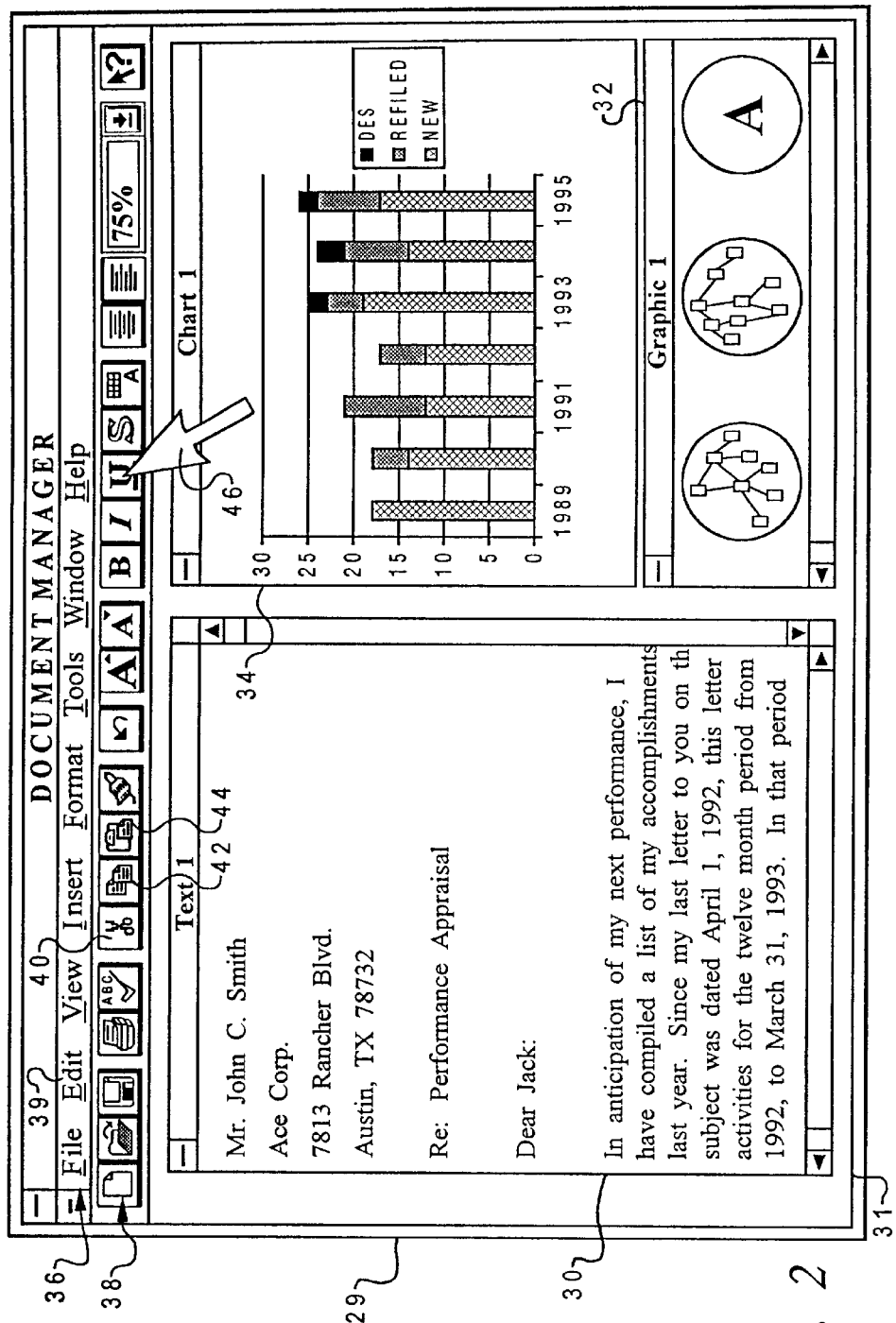
FIG. 2 depicts a computer display illustrating a conventional graphical user interface which employs a menu bar and a toolbar to allow simplified execution of user driven commands.

Referring to FIG. 2, a typical graphical user interface environment which would accommodate the present invention is depicted. The windowing environment depicted in FIG. 2 should also not be construed as a limiting feature of the invention. Many windowing environments or graphical user interface environments can effectively be utilized by the present invention. FIG. 2 will be explained in the context of the hardware depicted in FIG. 1.

In the graphical user interface (GUI) of FIG. 2, a generic application program entitled "Document Manager" is presented by the GUI as a primary application window or "parent window" 31. Parent window 31 is displayed on display device 29, which is equivalent to display monitor 22 of FIG. 1. In a preferred embodiment display device 29 is a video monitor. In the exemplary depiction, the application window has several secondary, enclosed windows. Secondary windows are commonly referred to as "child windows." Child windows 30, 32 and 34 display the contents of various files that are being executed by computer system 10 of FIG. 1.

Toolbar 38 is depicted above child windows 30 and 34. Toolbar 38 includes, selections represented by selectable toolbar buttons 40, 42 and 44. Toolbar buttons 40, 42, and 44 contain mnemonic pictures which enable an operator to select an operation or function utilizing visual recognition and association. The picture contained within the button is symbolic of the function that the selection button will preform if selected. Toolbar buttons utilizing icons inform the user what function the computer system will perform if the icon is selected. For example, selectable toolbar button 40 or the "Cut" operation is depicted as scissors, selectable toolbar button 42 or the "Copy" operation is depicted as a dual image, and selectable toolbar button 44 or the "Paste" operation is depicted as text being placed on a clipboard. Toolbar selections are generally duplicated as menu item selections. However, menu item selections are not visible to the user unless a menu heading, such as Edit 39 is selected by the user. If a user does not frequently utilize toolbar buttons, valuable screen space and toolbar space is wasted.

Selection of the functions or operations performed by toolbar buttons 40, 42 and 44 can be easily activated utilizing a pointing device having a push button switch. Activation of a function requires the user to point to the desired icon utilizing graphical pointer 46 and then depressing, typically, left pointing device button 80 of FIG. 1. Many experienced operators refer to this as "clicking on the icon".

Figure 3:
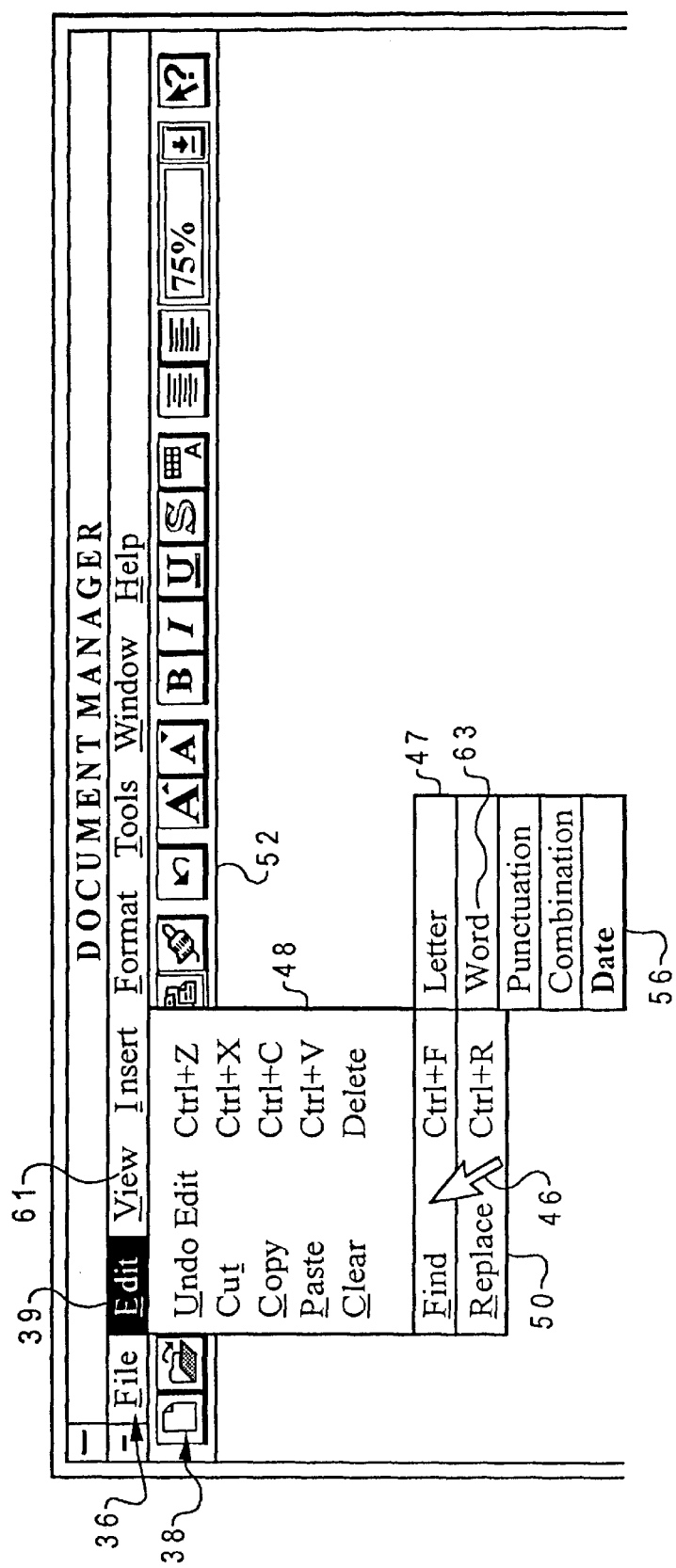
FIG. 3 is an illustration of the graphical user interface of FIG. 2 wherein a menu heading has been selected, resulting in the display of a pull-down menu and a sub-menu in accordance with the present invention.

Referring to FIG. 3, in a preferred embodiment, if the primary (i.e., left) pointing device button 80 of FIG. 1 is depressed when graphical pointer 46 is within the visual boundary of a menu item such as Find 50, as depicted, a highlighting of the menu item occurs to signify that the menu item is selected. If a menu item is selected for copy and transfer, right pointing device button 82 of FIG. 1 is depressed and cross-hatching of the selected menu item would occur. It is desired that a selection for transfer is distinguished from a selection for the implementation of a function. In response to right pointing device button 82 of FIG. 1, cross-hatching would signify that Find 50 is selected by the user to be moved onto toolbar 38. Alternatively, highlighting could be a bold outline around the menu item, a color change, or any other visual cue.

In a typical graphical user interface, menu headings such as Edit 39 or View 61 on menu bar 36 can be activated by graphical pointer 46. Activating a menu heading within a GUI displays a corresponding pull-down menu depicted in FIG. 3 by pull-down menu 48. Pull-down menu 48 has been activated by the selection of the menu heading entitled Edit 39. Typically, a pull-down menu has several menu items to select from. Often, menu item selections provide a link to further pull-down menus referred to as auxiliary menus or sub-menus. In FIG. 3, auxiliary pull-down menu 47 is displayed in response to the user selection of menu item Find 50 located under menu heading Edit 39.

Typically, toolbar icons are duplicated as selectable menu items. In the graphical user interface depicted in FIG. 3, three of the seven pull-down menu items are duplicated as tool buttons in toolbar 38. The "Cut, "Copy," and "Paste" menu items correspond to toolbar buttons 40, 42 and 44 of FIG. 2 as visible within toolbar 38. The present invention retains the duplicate locations of menu items and toolbar buttons after a copy and transfer is preformed.

Often, specific icons on toolbar 38 are underutilized. An icon which is rarely utilized constitutes a waste of toolbar space. Most computer users would prefer to have frequently selected menu items which reside in pull-down menus readily available as selectable toolbar buttons. Many users would prefer to exchange frequently utilized menu items for existing toolbar buttons which are rarely utilized even for short durations. Toolbar buttons offer a simple and user-friendly implementation of user commands. Often, a menu item from an auxiliary pull-down menu is frequently utilized. Selection from an auxiliary pull-down menu is much more intricate than selection from a toolbar.

Referring to FIG. 3, Edit 39 has been selected by graphical pointer 46 and pull-down menu 48 has appeared. Next, graphical pointer 46 has been moved to Find 50 menu selection and auxiliary pull-down menu 47 has appeared. If an operator is habitually selecting Find 50 in conjunction with the auxiliary menu selection of Word 63, a user would desire to select Find 50 and Word 63 utilizing a single point and click effort. After the simple setup of the present invention, a single point and click is required to select an item which was previously in an auxiliary pull-down menu.

Typically, to make a menu selection, an operator places graphical pointer 46 within the visual boundary of an icon and depresses the left pointing device button 80 of FIG. 1.

To create a toolbar selection from a menu item in the present invention, the computer operator utilizes a secondary button of pointing device 28 to select, drag, and drop a menu item onto toolbar 38. In a preferred embodiment, the secondary pointing device button is right pointing device button 82 of FIG. 1. In other embodiments utilizing a three push button pointing device, the conversion selection button could be a center pointing device button or alternately a keyboard entry.

Selecting a menu item utilizing a secondary mouse button creates a copy of the menu item, dragging moves the copy and releasing right pointing device button 82 of FIG. 1 drops the menu item copy onto toolbar 38. Adding selections to toolbar 38 is realized by a fluid operation and does not require special menu heading selections, sub-menu selections and menu items or mode selections. After creation of a toolbar selection, the user is required to remember menu item locations. In a preferred embodiment, although menu item 52 is visually moved or transferred from pull-down menu 48 to toolbar 38 in the dragging operation, the menu item still resides in auxiliary pull-down menu 47 or pull-down menu 48 as a duplicate. If toolbar 38 is full, the present invention will automatically replace the least utilized toolbar icon with the selected menu item.

Figure 4:
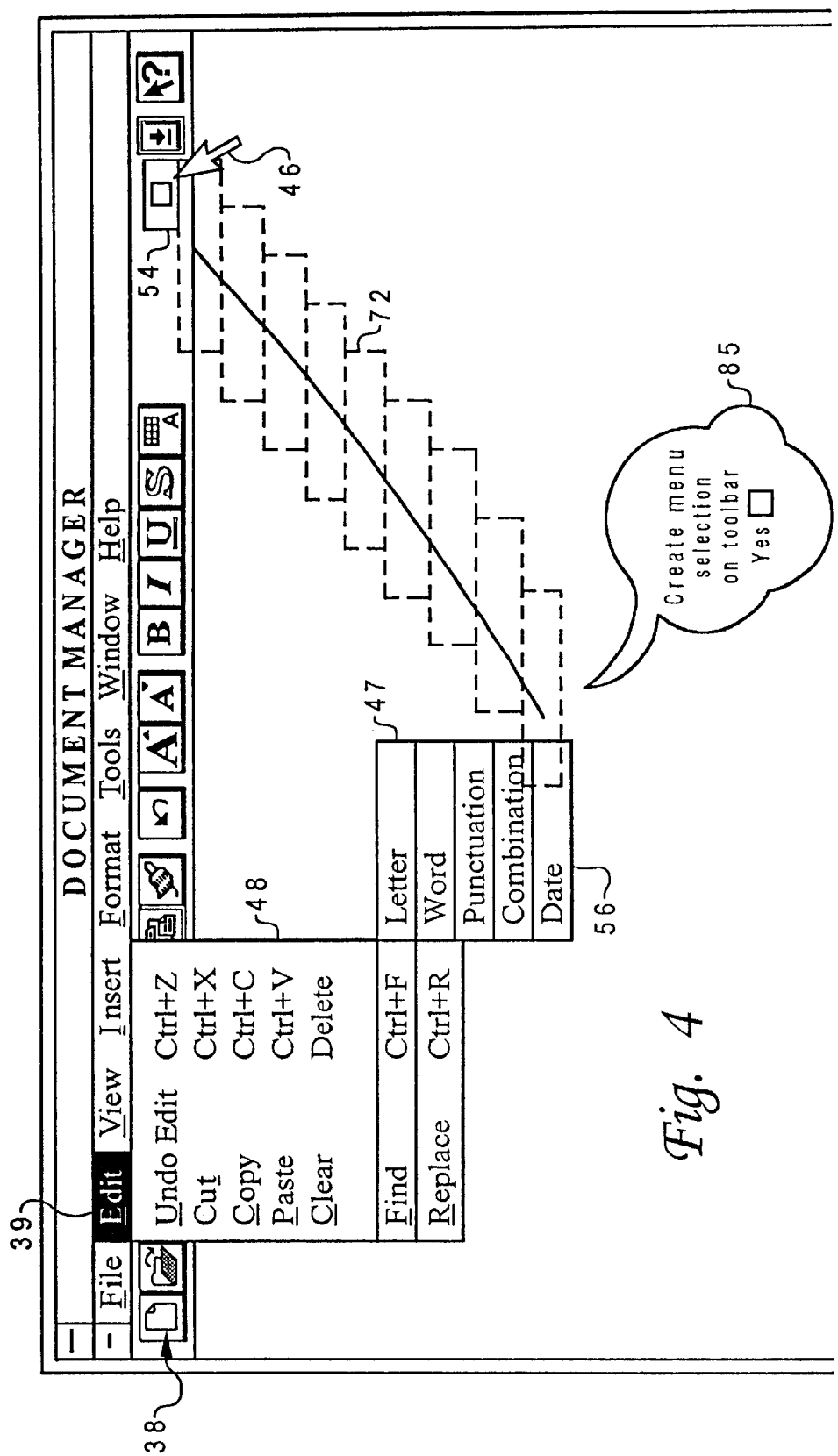
FIG. 4 depicts a select, drag, and drop operation of a menu item to create a selectable toolbar button.

In FIG. 4, the series of dashed boxes 72 indicate a possible path which the menu selection can traverse as the user selects and drags Date 56 to toolbar 38. Hence, a transferred copy of menu items would be duplicated on toolbar 38 after the process of the present invention is complete.

Additionally, with reference to FIG. 1, computer system 10 may store in memory each occurrence of a user selection of a menu item. Recording the number of times a menu item has been selected by a user within a predetermined amount of time, provides a frequency of utilization. If a menu item is selected more than a predetermined number of times over a give period of time, the user may be queried by the application software whether to copy and move the menu item to toolbar 38.

In a preferred embodiment, the predetermined "selection per unit time" threshold would be set by the user. In a further embodiment, the application software could automatically transfer a copy of the toolbar in response to heavy utilization of a menu item.

In a preferred embodiment, the query to the user by the application software would be made upon the fourth selection of a particular menu item within one hour. In response to the query to the user on the graphical user interface depicted by conservation bubble 85, the user could select a "yes" button and the application software would automatically create the toolbar button corresponding to the frequently selected menu item. Additionally, the automatically created toolbar button would replace the least frequently utilized toolbar button if open space on the toolbar does not exist. The application software query is depicted in the form of bubble help. However, other methods could be utilized without departing from the scope of the invention.

During the copy and transfer process depicted in FIG. 4, highlighting is accomplished by changing the appearance such as the background color or cross-hatching to provide feedback to the user that a menu item has been selected for placement onto a toolbar. Highlighting as a method of user feedback should not be construed in limiting the scope of the invention. Many acceptable graphical depictions which would effectively accomplish user feedback in the present invention.

In an alternate embodiment, in response to a right pointing device button 82 input of FIG. 1, a conversation bubble appears, denoting a copy and transfer of a menu item has been selected by the user or that a menu item to an icon conversion will be performed by the computer system. It would be preferred that the conversation bubble appears subsequent to graphical pointer 46 being positioned on a menu item. Particularly, if the software has determined that there has been frequent utilization of a menu item, the conversation bubble appears and provides the question "create menu selection on toolbar?" as depicted by conversation bubble 85.

Figure 5:
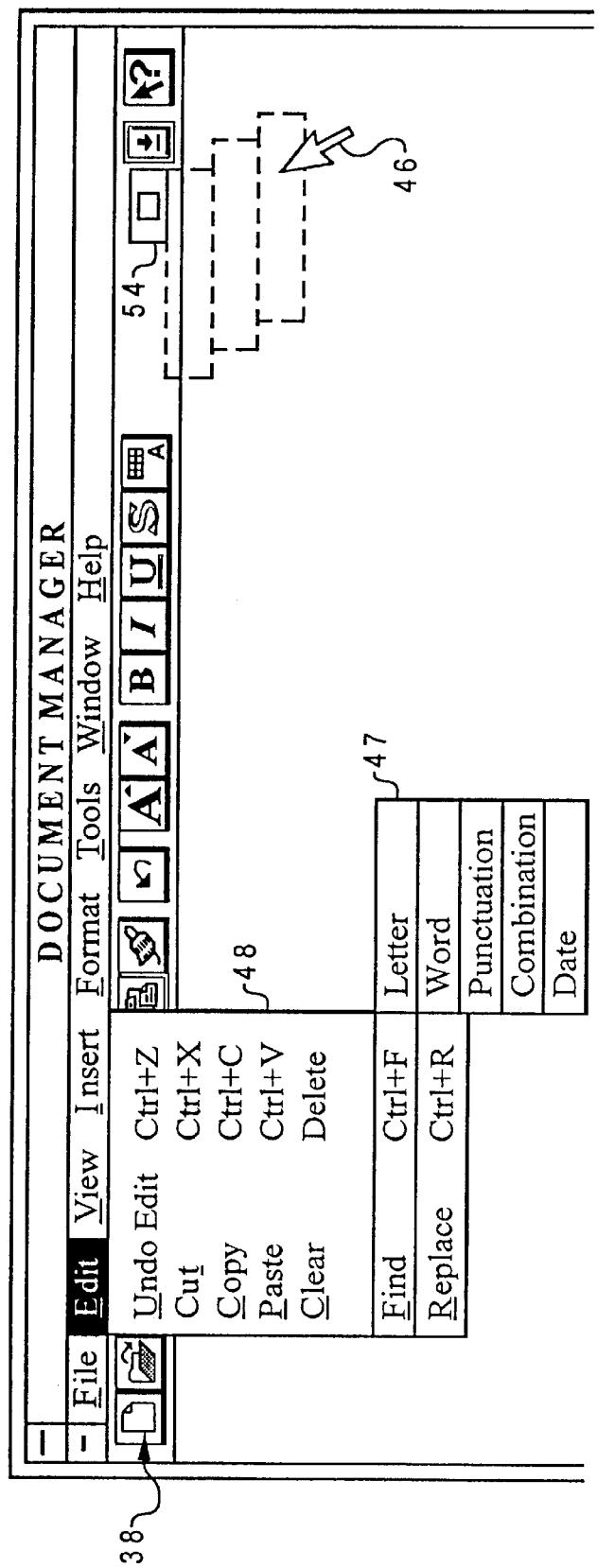
FIG. 5 illustrates a drag and drop operation to remove a selectable toolbar button from the toolbar.

Referring to FIG. 5, the present invention may also be applied in the reverse context for removing underutilized toolbar buttons. For example, when the user determines that utilization of an icon on toolbar 38 is infrequent, the toolbar button or icon can be removed from toolbar 38. In this embodiment, after selecting an icon utilizing right pointing device button 82 of FIG. 1 and dragging toolbar button 54 from toolbar 38 and releasing right pointing device button 82 of FIG. 1, would remove toolbar button 54 from toolbar 38. In FIG. 5, the dashed blocks denotes the path the toolbar button might take when being removed from toolbar 38.

The present invention has several benefits. It retains current behavior and user interaction with toolbars and menu bars. The dynamic transition of selections from menu items to toolbar icon extends the functionality of the GUI without increasing its visual complexity. Particularly, the utilization of a custom toolbar allows the user to quickly and easily complete repetitive tasks. The present invention avoids frequent lengthy searches for commonly utilized selections which are not visible in an operational mode. After moving a menu item to toolbar 38, a simple click upon the newly created toolbar button will implement operation of the application corresponding of the selected tool. The present invention eliminates hunting and pecking for buried menu items and reduces the time and effort required for accessing frequently utilized tools. The present invention utilizes a simple user input to create more efficient access to popular tools.

The repeated precision and dexterity required for moving graphical pointer 46 to illuminate menus, such as pull-down menu 48 and sub-menus, such as auxiliary pull-down menu 47, then clicking with pointer buttons can be alleviated by the present invention. The present invention allows converted menu items to be easily selected after a copy and transfer creates a new toolbar button. Additionally, the present invention can easily be utilized in conjunction with "bubble help." Bubble help is commonly utilized in GUIs when a user passes the mouse pointer over a selectable item and bubble help window appears and can narrate the function of the selection. It is preferred that bubble help is located in close proximity to graphical pointer 46.

In a preferred embodiment, after selection, dragging and dropping of menu items, the application software automatically converts the labeled menu item block into a toolbar button with predetermined text or, alternatively an icon having a small image relating to the function which it performs. Alternatively, the small image contained within a toolbar button may be user selected from a group of icons or it may be automatically provided by the graphical user interface software. In a preferred embodiment, the newly created toolbar button is automatically labeled similar to the menu item label provided in the pull-down menu. Alternatively, the user might be queried to select an icon or text from a predetermined list for identification of the new button to the user.

Figure 6:
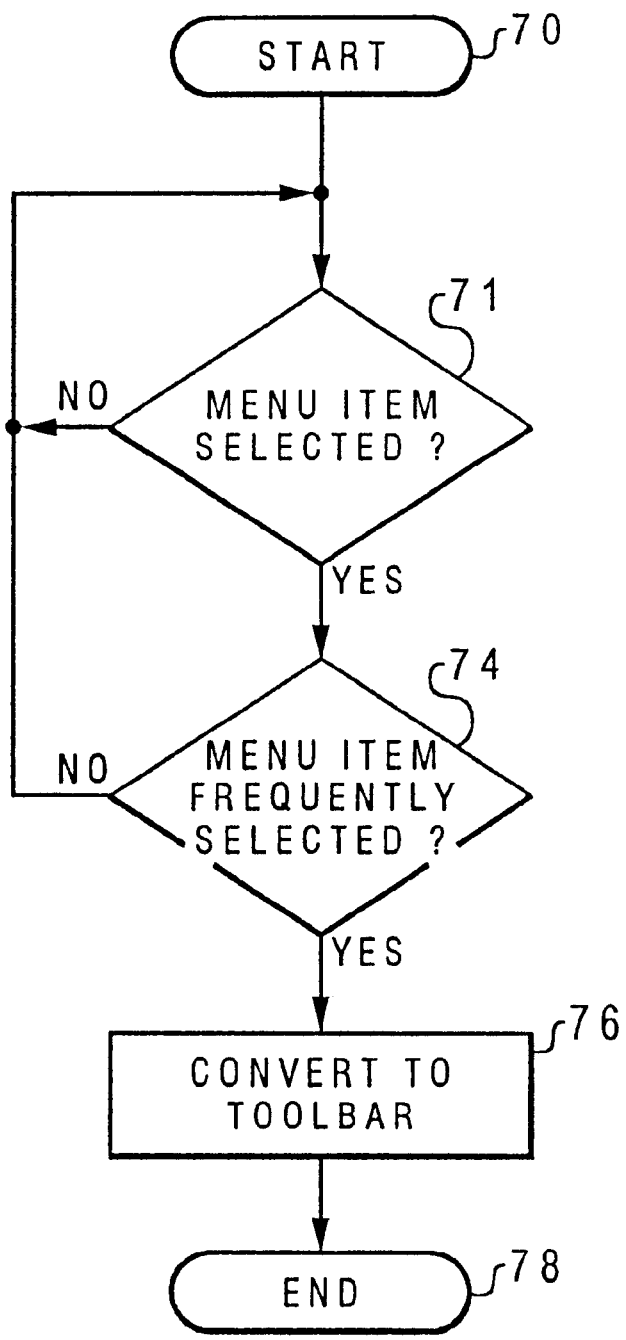
FIG. 6 illustrates a high level flow chart of a preferred embodiment of the present invention.

Referring now to FIG. 6, a high level flow chart of a preferred embodiment of the present invention is depicted. The process commences at block 70 and thereafter proceeds to block 71. In block 71, the process is informed if a menu item is selected by a user. If a menu item is selected, the process determines if the menu item has been frequently selected as depicted in block 74. A frequency determination can be implemented by a counter correlated with a timer. If the selected menu item has not been frequently selected, the process returns to block 71. If the menu item has been frequently selected, the process proceeds to block 76 where the menu item is converted into a toolbar selection. Thereafter, the process proceeds to block 78 where the process ends.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

While the invention has been particularly shown and described with reference to a preferred embodiment, it will be understood by those skilled in the art that various changes in form and detail may be made therein without departing from the spirit and scope of the invention.

What is claimed is:

1. A computer apparatus comprising:
   a display device;
   a processor,
   means for said processor to cause said display device to depict a graphical user interface, said graphical user interface for displaying a toolbar and a menu-bar, said toolbar having toolbar buttons, and said menu bar having at least one menu category heading;
   a pointing device having a left push button and a right push button coupled to said processor and said display device, said left button of said pointing device for selecting said at least one menu category heading within said menu bar, wherein said selection of said menu category heading by said left button of said pointing device causes said display device to display said pull-down menu, said pull-down menu having a plurality of menu item, said right push button of said pointing device for selecting a menu item from said plurality of menu items, said selection indicated on said GUI;
   means for said processor to cause a visual dragging of said selected menu item from said pull-down menu to said toolbar in response to said right button of said pointing device, such that said visual dragging of said selected menu item to said toolbar creates a new selectable toolbar button corresponding to an underlying functional aspect of said selected menu item, wherein a frequently utilized menu item can be easily converted into a new selectable toolbar button;
   means for recording the frequency of menu item utilization; and
   means for prompting the user to create a selectable toolbar button from said menu item in response to said frequent utilization.

2. A method for utilization within a graphical user interface for conveniently converting frequently utilized menu items into toolbar buttons, wherein said graphical user interfaces includes at least one pull-down menu and at least one tool bar location, said method comprising the steps of:
   selecting a pull-down menu from at least one pull-down menu by utilizing a first user input, said pull-down menu having a plurality of menu items;
   selecting a menu item from said plurality of menu items utilizing a pointing device, said pointing device having at least two inputs, wherein said selecting step utilizes a first user input of said at least two inputs;
   designating said selected menu item for copy and transfer utilizing a second user input of said at least two inputs;
   dragging said designated menu item from said pull-down menu in response to an input from said pointing device wherein said dragging step is symbolic of a moving of an underlying functional aspect of said menu item and its name;
   dropping said designated menu item on said toolbar location in response to said second user input;
   automatically converting said designated menu item into a selectable toolbar button having said underlying functional aspects within said toolbar in response to said dropping step, wherein said tool button is created in response to said dragging step and wherein a user who frequently utilizes a menu item within said pull-down menu can now select said underlying functional aspects of said menu item by clicking on said toolbar button;
   determining if menu item utilization is frequent, said determining being dynamically completed by internal logic linked to said GUI, wherein a given threshold value is established within said GUI to indicate frequent utilization; and
   automatically suggesting to a user conversion from a menu item to a selectable toolbar button in response to said determination.

3. The method of claim 2, wherein said step of selecting a menu item further comprise providing an on-screen description of the function selected by said right button of said pointing device and a query to said user to initiate the drag and drop steps.

4. A method for utilization within a graphical user interface for conveniently converting frequently utilized menu items into toolbar buttons, wherein said graphical user interfaces includes at least one pull-down menu and at least one tool bar location, said method comprising the steps of:
   selecting a pull-down menu from at least one pull-down menu by utilizing a first user input, said pull-down menu having a plurality of menu items;
   selecting a menu item from said plurality of menu items utilizing a pointing device, said pointing device having at least two inputs, wherein said selecting step utilizes a first user input of said at least two inputs;
   designating said selected menu item for copy and transfer utilizing a second user input of said at least two inputs;
   dragging said designated menu item from said pull-down menu in response to an input from said pointing device wherein said dragging step is symbolic of a moving of an underlying functional aspect of said menu item and its name;
   dropping said designated menu item on said toolbar location in response to said second user input;
   automatically converting said designated menu item into a selectable toolbar button having said underlying functional aspects within said toolbar in response to said dropping step, wherein said tool button is created in response to said dragging step and wherein a user who frequently utilizes a menu item within said pull-down menu can now select said underlying functional aspects of said menu item by clicking on said toolbar button; and
   automatically moving particular menu items to said toolbar location in response to a user's frequent utilization of said particular menu items.

\* \* \* \* \*